United States Patent
Jörgensson et al.

(10) Patent No.: US 11,536,325 B2
(45) Date of Patent: Dec. 27, 2022

(54) CLUTCH UNIT

(71) Applicant: Volvo Car Corporation, Gothenburg (SE)

(72) Inventors: Mathias Jörgensson, Gothenburg (SE); Emil Åberg, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 17/206,969

(22) Filed: Mar. 19, 2021

(65) Prior Publication Data
US 2021/0324923 A1    Oct. 21, 2021

(30) Foreign Application Priority Data

Apr. 17, 2020 (EP) .................................... 20170113

(51) Int. Cl.
*B60K 17/02* (2006.01)
*F16D 41/04* (2006.01)
(Continued)

(52) U.S. Cl.
CPC ............... *F16D 41/16* (2013.01); *B60K 1/00* (2013.01); *B60K 17/02* (2013.01); *B60K 17/165* (2013.01);
(Continued)

(58) Field of Classification Search
CPC .......... F16D 41/16; F16D 23/12; F16D 25/00; F16D 41/04; F16D 2023/123; B60K 1/00;
(Continued)

(56) References Cited

U.S. PATENT DOCUMENTS 2,134,405 A * 10/1938 Hulshizer ............. E21B 19/081
188/82.2
3,197,001 A * 7/1965 Clements ................ F16D 23/10
192/69.3
(Continued)

FOREIGN PATENT DOCUMENTS

EP         1873416 A1    1/2008
EP         3456568 A1    3/2019

OTHER PUBLICATIONS

Extended EP Search Report for EP Application No. 20170113.3 dated Jun. 2, 2020, 6 pages.

*Primary Examiner* — Stacey A Fluhart
*Assistant Examiner* — Farhana Pervin
(74) *Attorney, Agent, or Firm* — Amin, Turocy & Watson, LLP (57) ABSTRACT

A clutch unit for a drive unit, comprising: at least one outer ring and one inner ring, wherein the rings are mounted rotatably relative to each other, the outer ring being configured to be in operative engagement with a first component of a drive unit of a vehicle and the inner ring being configured to be in operative engagement with a second component of a drive unit of a vehicle; at least one first locking element; at least one first displacement element; the at least one first locking element being movably mounted on one of the rings and being movable by the displacement element in order to engage in a corresponding recess of the other ring a rotationally fixed connection of the two rings in at least a first direction of rotation being provided.

20 Claims, 8 Drawing Sheets

(51) Int. Cl.
  *F16D 41/16* (2006.01)
  *B60K 1/00* (2006.01)
  *B60K 17/16* (2006.01)
  *F16D 23/12* (2006.01)
  *F16D 25/00* (2006.01)

(52) U.S. Cl.
  CPC ............. *F16D 23/12* (2013.01); *F16D 25/00* (2013.01); *F16D 41/04* (2013.01); *B60K 2001/001* (2013.01); *F16D 2023/123* (2013.01)

(58) Field of Classification Search
  CPC .................. B60K 17/02; B60K 17/165; B60K 2001/001; F16H 48/16; F16H 2048/085; F16H 2048/208; F16H 2048/364; F16H 2048/368
  See application file for complete search history.

(56) References Cited

U.S. PATENT DOCUMENTS

| | | | | |
|---|---|---|---|---|
| 4,222,473 | A | | 9/1980 | Kopich |
| 5,967,277 | A | * | 10/1999 | Walter .................... F16D 41/16 192/35 |
| 11,209,053 | B2 | * | 12/2021 | Wys ...................... F16D 27/102 |
| 2006/0021837 | A1 | * | 2/2006 | Kimes .................... F16D 41/12 192/46 |
| 2008/0000747 | A1 | * | 1/2008 | Saka ....................... F16D 41/14 192/43.2 |
| 2009/0005212 | A1 | * | 1/2009 | Maguire ................. F16D 41/14 475/323 |

* cited by examiner

CLUTCH UNIT

CROSS-REFERENCE TO RELATED APPLICATIONS

This application claims priority to EP Patent Application No. 20170113.3, filed on 17 Apr. 2020, entitled " CLUTCH UNIT", The entirety of the aforementioned application is hereby incorporated herein by reference.

TECHNICAL FIELD

The present disclosure relates to a clutch unit for a drive unit, a drive unit comprising such a clutch unit, a use of such a clutch unit in a drive unit, and a vehicle, in particular a vehicle with an electric drive, comprising such a drive unit.

BACKGROUND ART

In the prior art, it is known that in vehicle drive units, there are situations and applications in which transmission elements have to be separated from each other or where it is advantageous to be able to disconnect such transmission elements.

For example, in battery-powered vehicles or vehicles with hybrid drives, it is of advantage to be able to disconnect an electric drive from a drive line, for example to avoid unnecessary rotating masses as far as possible. For this purpose, it is known in the prior art to use spline interfaces, e.g. spline clutches, to connect and disconnect two parts. However, such spline interfaces requires synchronization of the relative rotation speed, which may delay the availability of applying torque.

SUMMARY

In view of this, it is found that a further need exists to provide a solution for coupling and decoupling input and output elements of a drive unit.

In the view of the above, it is an object of the present invention to provide a solution for coupling and decoupling input and output elements of a drive unit.

These and other objects, which become apparent upon reading the following description, are solved by the subject matter of the independent claims. The dependent claims refer to preferred embodiments of the invention.

According to a first aspect, a clutch unit for a drive unit is provided, comprising: at least one outer ring and one inner ring, wherein the rings are mounted rotatably relative to each other, wherein the outer ring is configured to be in operative engagement with a first component of a drive unit of a vehicle and the inner ring is configured to be in operative engagement with a second component of a drive unit of a vehicle; at least one first locking element; at least one first displacement element; wherein the at least one first locking element is movably mounted on one of the rings and is movable by the displacement element in such a way that it engages in a corresponding recess of the other ring in such a way that a rotationally fixed connection of the two rings in at least a first direction of rotation is provided.

In other words, the present disclosure provides an active controllable freewheel clutch, which can be placed between an input and an output element/component of a drive unit and by which a relative movement between the inner ring and the outer ring in a first direction can be permitted or prevented, depending on whether the locking element is arranged in the corresponding recess of the other ring. This allows a fast connection and disconnection of the inner ring and the outer ring, i.e. and of the respective components connected to them, in comparison to the commonly used spline clutches. Moreover, the present solution can be implemented with less weight compared to a solution with spline clutches.

In an example, the first component of the drive unit, which can be operatively engaged with the outer ring, may be a planetary carrier element, which in turn may be driven by a motor unit, e.g. an electro motor unit. In an example, the second component of the drive unit, which can be operatively engaged with the inner ring, may be a housing of a differential assembly, which in turn may be operatively connected to a drive line. In such an example, a disconnecting being done between the planetary carrier element and the differential housing such that the otherwise rotating mass when the motor stops can be avoided. In an example, the locking element can be provided as (clutch) pawl elements. In an example, a plurality of locking element, e.g. pawl elements, may be arranged on/at one of the rings in such a way that a respective locking element can be moved in a corresponding recess, i.e. each locking element can be move between a an active/engaged position and an inactive/retracted position. The displacement element can be provided by any movable means by which the locking element(s) can be moved between an active/engaged position and an inactive/retracted position. However, in this context, it should be noted that the present disclosure is not limited to such an application.

In an implementation, the clutch unit further comprises: at least one second locking element; at least one second displacement element; wherein the at least one second locking element is movably mounted on one of the rings and is movable by the second displacement element in such a way that it engages in a corresponding recess of the other ring in such a way that a rotationally fixed connection of the two rings in a second direction of rotation opposite to the first direction of rotation is provided. In an example, the second locking elements and the second are provided similar to the first locking elements, e.g. as pawl elements, arranged on/at one of the rings in such a way that a respective locking element can be moved in a corresponding recess by means of the second displacement element and can be moved between an active/engaged position and an inactive/retracted position. In this implementation, it is possible not only to block or allow relative movement of the inner ring and outer ring in one direction of rotation, but to provide such functionality in both directions of rotation. In an example, the first and the second locking elements are provided on one of the rings, e.g. the inner ring, and the corresponding recesses are provided on the other ring, e.g. the outer ring.

In an implementation, the first and/or second displacement element comprises: at least one drive and return element; and at least one actuating element which is in operative engagement with the at least one locking element in order to move the at least one locking element; wherein the actuating element is preferably arranged between the outer ring and the inner ring; wherein the drive and return element is operatively engaged with the actuating element such that the actuating element is movable into a first position and into a second position, wherein in one of the two positions of the actuating element the locking element is moved in a corresponding recess of the other ring and in the other position of the actuating element the locking element does not engage in the recess of the other ring. In an example, the actuating element of the first and/or second displacement element are provided by respective actuating rings arranged between the inner and outer rings in such a way that the can be moved between a first position in which they push/move the respective locking element into a respective recess. In an example, the two actuating rings are arranged between the inner ring and outer ring, wherein one actuating ring is assigned to the first locking element(s), i.e. to move the first locking element(s) between an active/engaged position and an inactive/retracted position, wherein the other actuating ring is assigned to the second locking element(s), i.e. to move the second locking element(s) between an active/engaged position and an inactive/retracted position.

In an implementation, the at least one drive element is provided in the form of a hydraulic cylinder arrangement and the return element is provided in the form of a spring element; wherein the drive element is configured to move the actuating element into one of the two positions and the return element is configured to move the actuating element into the other position. In an example, the drive elements are provided by means of hydraulic cylinders, wherein each hydraulic cylinder is assigned to push one of the actuating rings in a first position where the locking elements are positioned in an inactive/retracted position, wherein a spring element pushed against the actuating ring such that the actuating rings are pushed in a second position where the locking element are positioned in an active/engaged position, once a respective hydraulic cylinder is set load-free. In a further example, the drive element may be provided by means of electrical actuators or electromagnetic actuators. In a further example, the drive element may be provided by means of only one actuator, wherein both actuating rings may be controlled via a single cam curve element.

In an implementation, the displacement element comprises, preferably the actuating element of the displacement element, e.g. the actuating ring(s), at least one ramp-shaped cross-section for moving/pushing the locking element into the corresponding recess of a ring.

In an implementation, the clutch unit comprises a first mode of operation in which no locking element engages a recess of a ring so that both rings are independently rotatably provided; and/or comprises a second mode of operation in which only the at least one first locking element engages a corresponding recess of a ring to provide a rotationally fixed connection of the two rings in at least the first direction of rotation, e.g. a counter clockwise direction; and/or comprises a third mode of operation in which only the at least one second locking element engages a corresponding recess of a ring to provide a rotationally fixed connection of the two rings in at least the second direction of rotation; and/or a fourth mode of operation in which the at least one first locking element and the at least one second locking element each engage corresponding recesses of a ring to provide a rotationally fixed connection of the two rings in the first direction of rotation and the second direction of rotation. In an example, e.g. in an all-wheel driving vehicle comprising two electric motors, the steps for regulating a clutch unit from a fully disconnected state, i.e. a first mode of operation, where one of the electric motors is disconnected from the drive line/load, into a fully connected state, i.e. a fourth mode of operation, may as following: (i) it is detected that needed power requires the $2^{nd}$ electric motor to be connected; (ii) the inverter is started up; (iii) the $2^{nd}$ electric motor speed ramp up; (iv) the clutch unit is set to the second operation mode; (v) the $2^{nd}$ electric motor reaches wheel speed and the first locking elements, e.g. counter clockwise pawl element(s) engage the outer ring such that the $2^{nd}$ electric motor may apply a positive torque; (vi) the clutch unit is set to the fourth mode such that the $2^{nd}$ electric motor may apply negative torque, i.e. can be operated in a regeneration mode.

Furthermore, in an example, six first locking elements and six second locking elements are distributed at/on one of the rings, e.g. the inner ring. In an example, there are more recesses provided in one of the rings than there are locking elements at/on the other ring. This can improve the synchronization process, since this allows the respective locking element to move into the next recess at a small differential speed between the two rings, so that higher forces can be avoided, if the motor accelerates even further. In an example, the locking elements may be provided as pawl elements, wherein the pawl elements may be provided with chamfered or beveled edges.

According to a further aspect, a drive unit for a vehicle is provided, comprising: at least one motor unit; at least one drive wheel operatively connected to and drivable by the motor unit; a differential gear with a housing unit which is driveable by the drive wheel; wherein the drive wheel and the housing unit are arranged around a common axis of rotation; wherein at least one clutch unit as described above is provided between the drive wheel and the housing unit. In this respect, it is referred to the above described possible implementations and examples.

In an implementation, an inner ring of the clutch unit is arranged rotationally fixed to the housing unit of the differential gear; and an outer ring of the clutch unit is arranged rotationally fixed to the drive wheel/element, e.g. a planetary carrier. In an example, both rings can be connected directly or indirectly, e.g. via one or more gear wheels, with the differential housing or the drive wheel/planetary carrier.

In an implementation, at least one drive element of the clutch unit, e.g. a hydraulic cylinder arrangement, is provided in a housing unit and wherein the at least one drive element is connected to at least one actuating element by means of a bearing arrangement. In an example, both drive elements are arranged in the same housing, wherein each one of the drive elements may push one of the actuating rings.

In an implementation, the drive wheel/planetary carrier at least partially encloses the housing unit of the differential gear. Thereby, a comparatively space-saving design can be provided.

In an implementation, the drive unit has at least a first operating mode in which no torque is transmitted between the drive wheel and the differential housing; and/or a second operating mode in which torque is transmitted between the drive wheel and the differential housing in a first direction only; and/or a third mode of operation in which torque is transmitted in a second direction between the drive wheel and the differential housing in a second direction only; and/or a fourth mode of operation in which torque is transmitted in both directions between the drive wheel and the differential housing.

In an implementation, the motor unit, e.g. an electric motor, and the drive wheel are operatively connected by means of a gear wheel unit.

A further aspect relates to a use of a clutch unit as described above in a drive unit as described above. A further aspect relates to a use of a differential gear comprising a housing unit arrangeable in a drive unit as described above. Finally, a further aspect relates to a vehicle, in particular a vehicle comprising an electric drive with at least one drive unit as described above.

BRIEF DESCRIPTION OF DRAWINGS

In the following, the disclosure is described exemplarily with reference to the enclosed figure, in which.

Notably, the figures are merely schematic representations and serve only to illustrate the preferred embodiment of the present disclosure. Identical or equivalent elements are in principle provided with the same reference signs.

DESCRIPTION OF EMBODIMENTS

Figure 1:
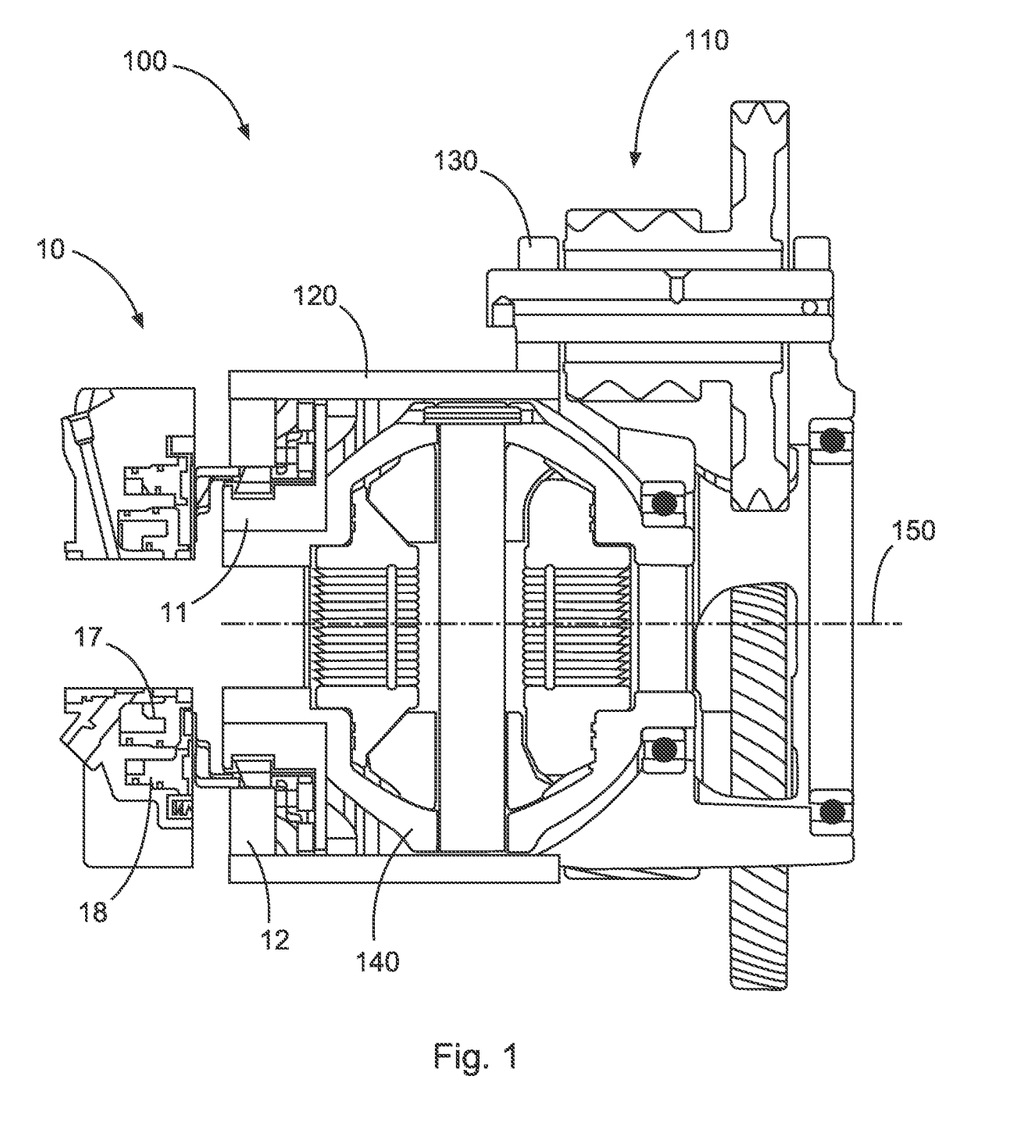
FIG. 1 is a schematic view of a drive unit according to a preferred embodiment of the present disclosure.
Figure 2:
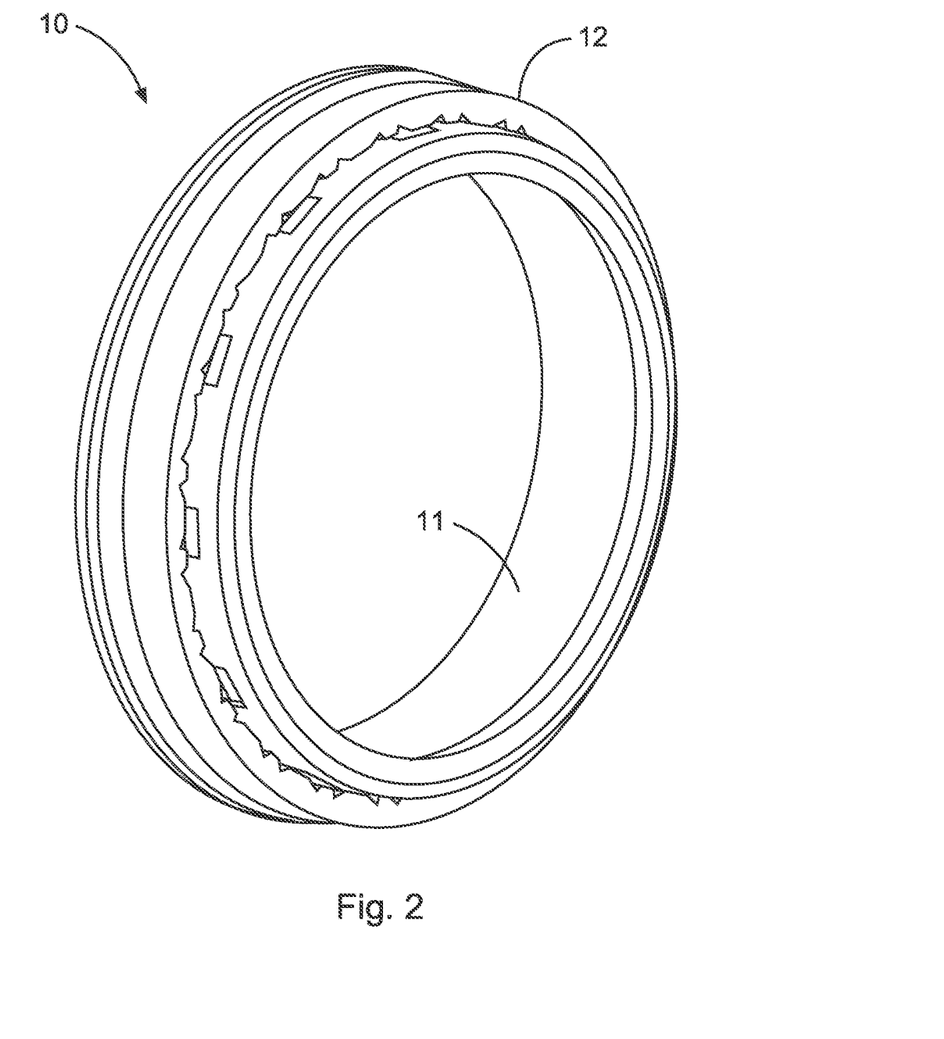
FIG. 2 is a schematic view of a clutch unit according to a preferred embodiment of the present disclosure.

FIG. 1 shows a schematic view of a drive unit 100 comprising a clutch unit 10 according to a preferred embodiment of the present disclosure.

The drive unit 100 comprises a motor unit 110, e.g. an electric motor unit 110, one drive wheel 120, e.g. a planetary carrier 120, which is operatively connected to and drivable by the motor unit 110 via a gear wheel 130. A differential gear with a housing unit 140 which is driveable by the drive wheel 120, wherein the drive wheel 120 and the housing unit 140 are arranged around a common axis of rotation 150. As can be taken form FIG. 1, the clutch unit 10 is provided between the drive wheel/planetary carrier 120 and the differential housing unit 140.

An inner ring 11 of the clutch unit 10 is arranged rotationally fixed to the differential housing unit 140 unit of the differential gear. An outer ring 12 of the clutch unit 10 is arranged rotationally fixed to the drive wheel/planetary carrier 120. Notably, in an alternative embodiment, both rings 11, 12 can be connected directly or indirectly, e.g. via one or more gear wheels, with the differential housing 140 or the drive wheel/planetary carrier 120.

Figure 3:
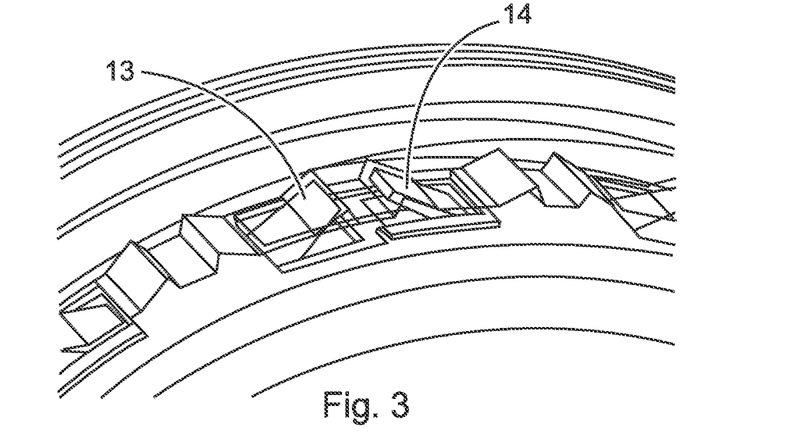
FIG. 3 is an enlarged schematic view the clutch unit shown in FIG. 2.
Figure 4:
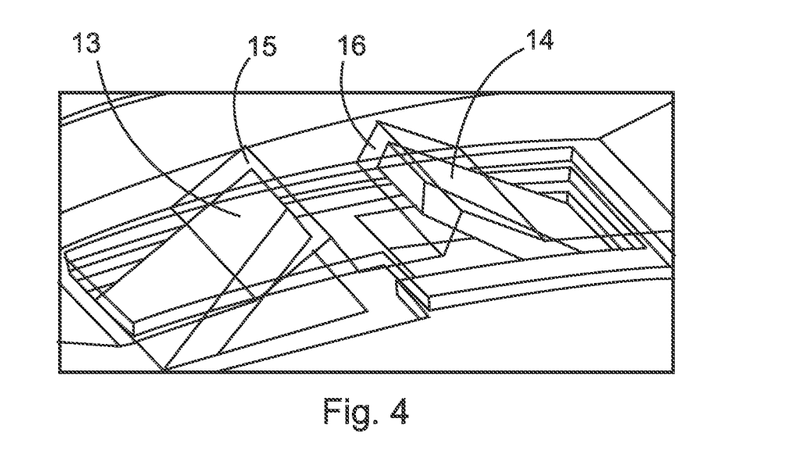
FIG. 4 is an enlarged schematic view the clutch unit shown in FIG. 2.
Figure 5:
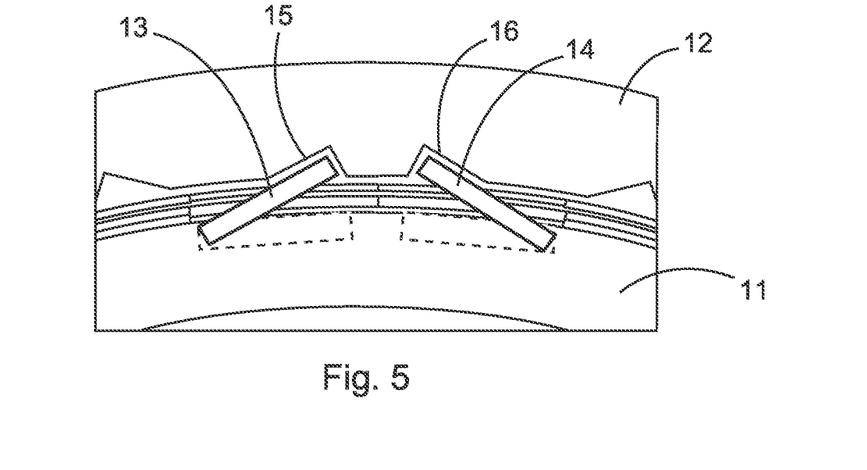
FIG. 5 is an enlarged schematic view the clutch unit shown in FIG. 2.
Figure 8A:
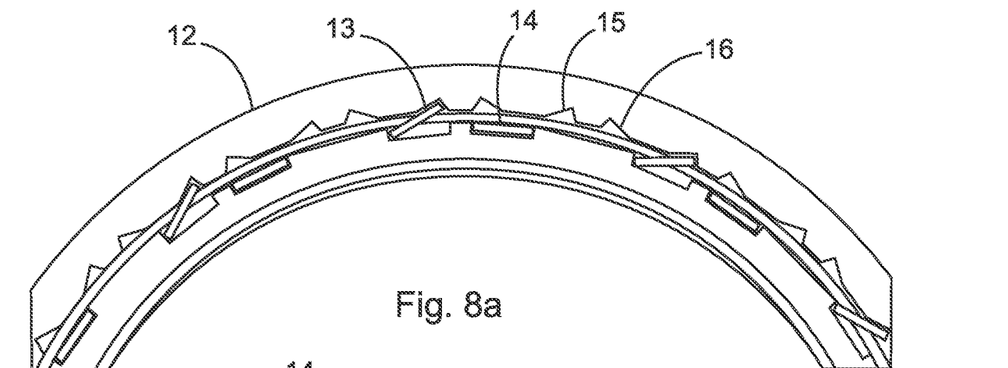
FIGS. 8a-8c are schematic views of the clutch unit in a second mode.
Figure 8B:
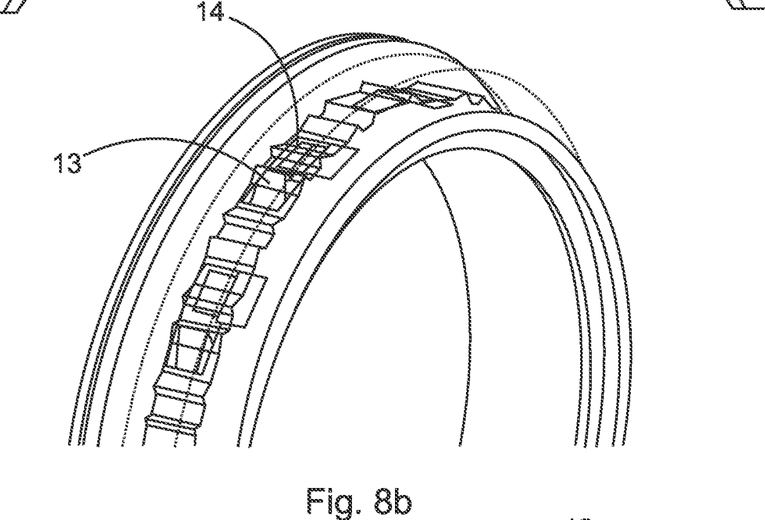
Figure 8C:
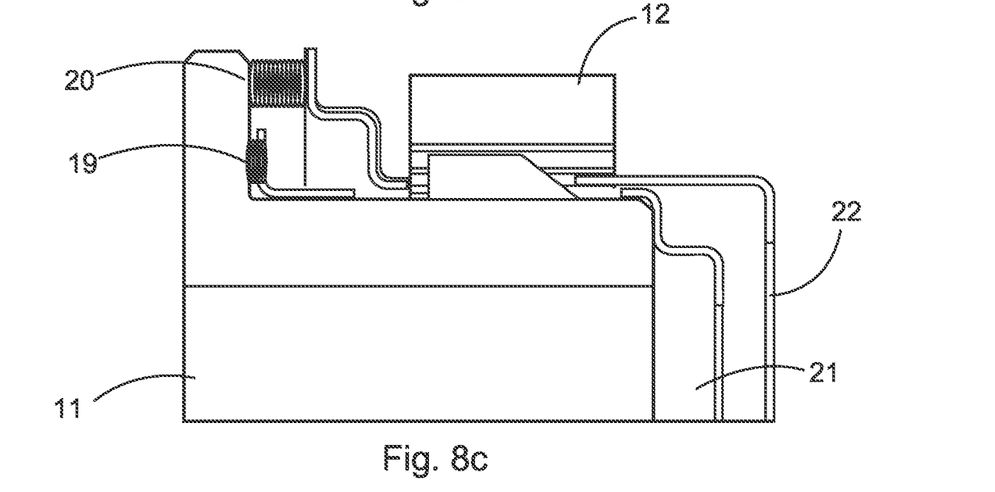
Figures 9A, 9B:
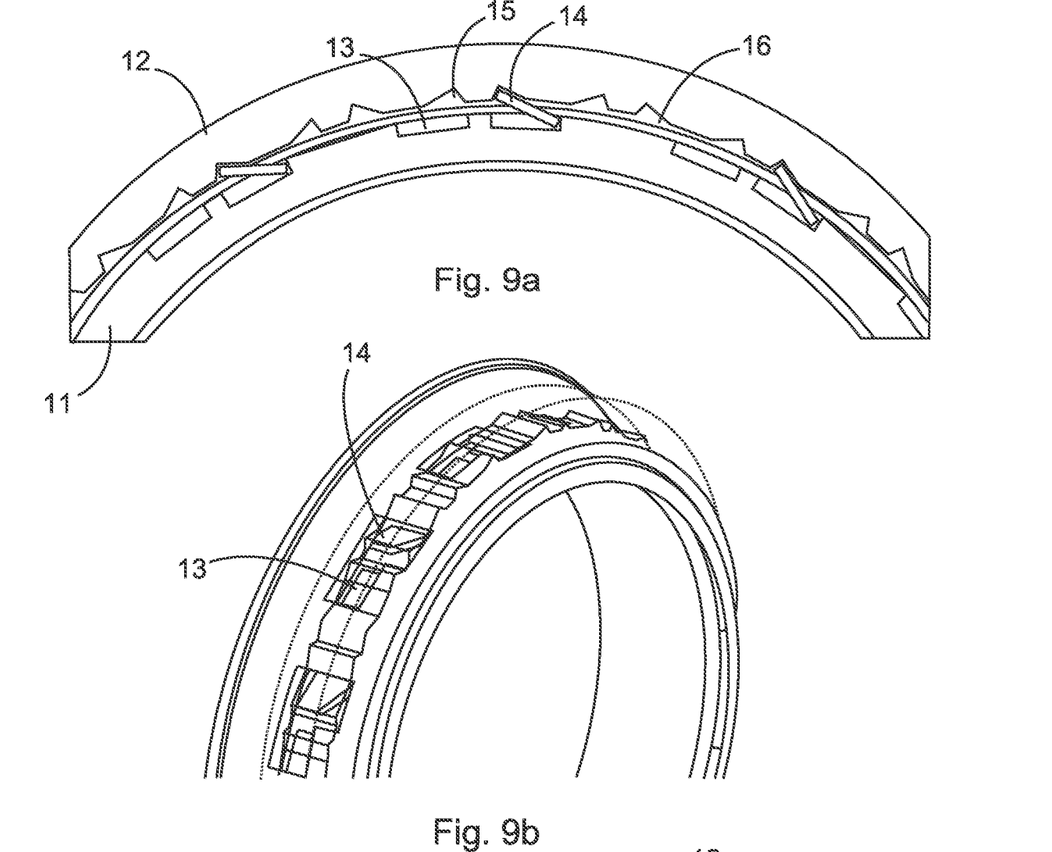
FIGS. 9a-9c are schematic views of the clutch unit in a third mode.
Figure 9C:
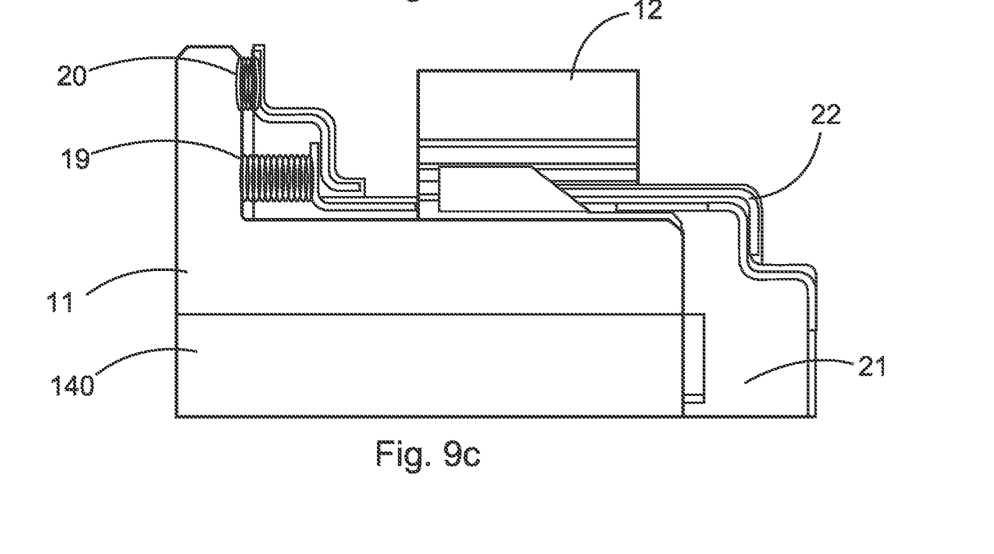

The clutch unit 10 further comprises first locking elements 13 and second locking elements 14 in form of (clutch) pawl elements 13, 14, wherein in the preferred embodiment, the first locking elements 13 provide counter clockwise locking (cf. FIG. 8) and the second locking elements provide a clockwise locking (cf. FIG. 9). A first displacement element 24 and a second displacement element (e.g., a second instance of the first displacement element 24) are provided for moving the first locking elements 13 and the second locking elements 14 between an active/engaged position, where the locking elements 13, 14 are moved into corresponding recesses 15, 16 provided in the outer ring 12, and an inactive/retracted position, where the locking elements 13, 14 are not arranged in the corresponding recesses 15, 16. As shown in FIGS. 3 to 5, in the shown embodiment, the locking elements 13, 14 are arranged at the inner ring 11 and the corresponding recesses 15, 16 are arranged at the outer ring 12.

Figure 6:
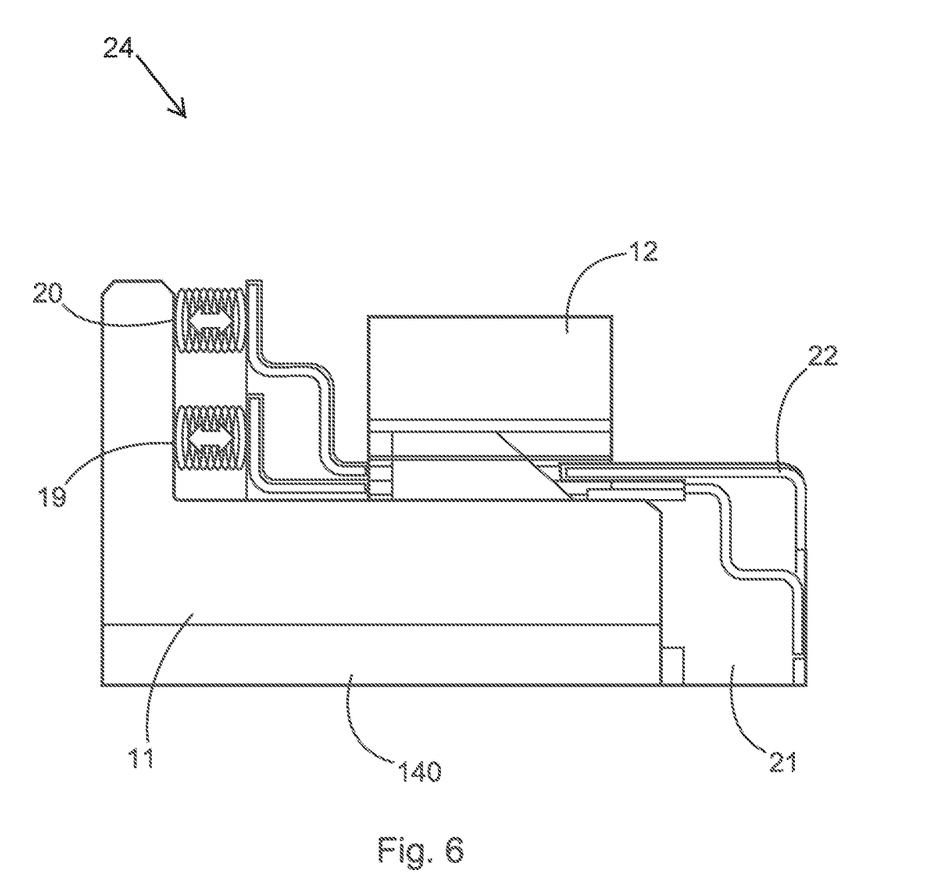
FIG. 6 is an enlarged cross-sectional view of a first and second displacement element.
Figures 7A, 7B:
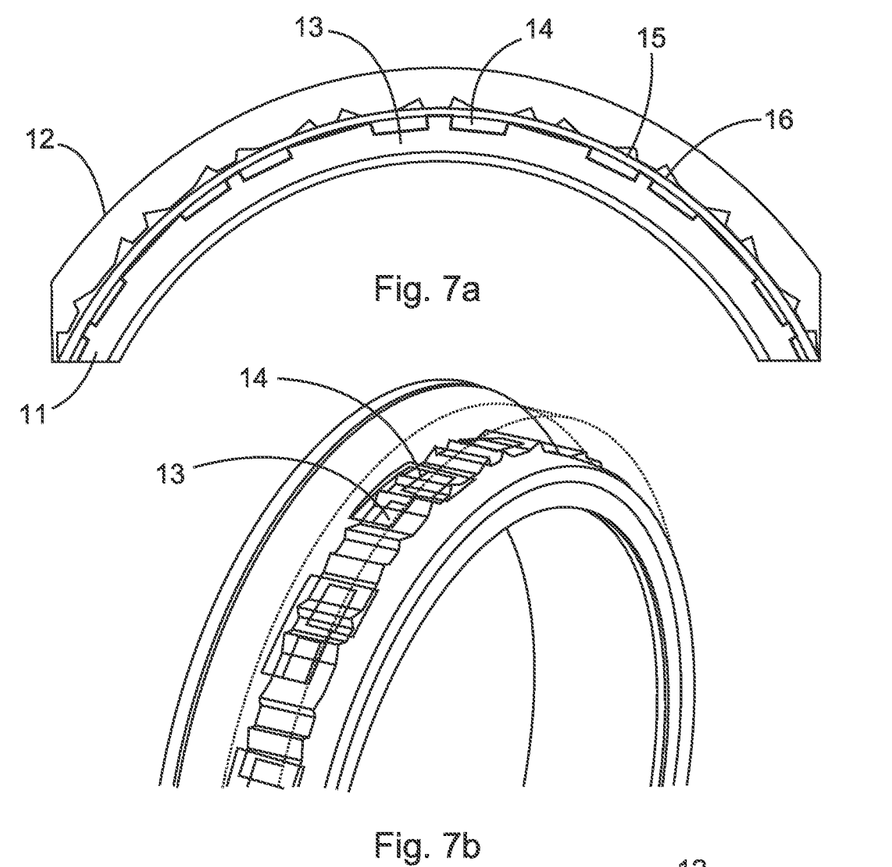
FIGS. 7a-7c are schematic views of the clutch unit in a first mode.
Figure 7C:
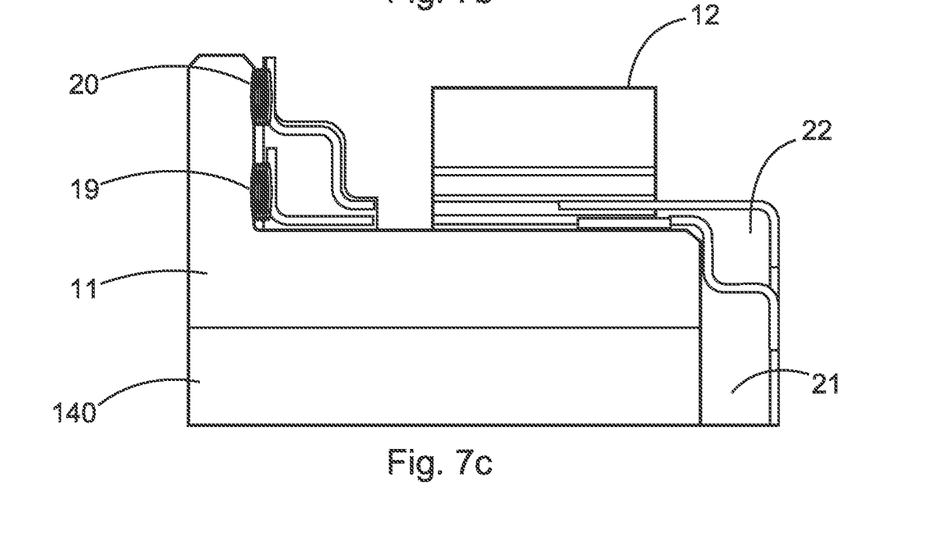

The first displacement element and the second displacement element each comprise a drive element 17, 18, here in form of hydraulic cylinder arrangements 17, 18 and return elements 19, 20 in form of spring elements 19, 20. The drive elements 19, 20 are configured to move an actuating element 21, 22, here in form of two actuating rings 21, 22, of the displacement elements. Each hydraulic cylinder arrangement 17, 18 is assigned to push one of the actuating rings 21, 22 in a first position where the locking elements 13, 14 are positioned in an inactive/retracted position, wherein the spring elements 19, 20 pushed against the actuating ring 21, 22 such that the actuating rings are pushed in a second position where the locking elements 13, 14 are positioned in an active/engaged position, once a respective hydraulic cylinder 17, 18 is set load-free. In an alternative embodiment, the drive element may be provided by means of electrical actuators. In a further example, the drive elements 17, 18 may be provided by means of only one actuator, wherein both actuating rings may be controlled via a single cam curve element.

In the shown embodiment, the two actuating rings 21, 22 are arranged between the inner ring 11 and outer ring 12, wherein one actuating ring 21 is assigned to the first locking element(s) 13, i.e. to move the first locking element(s) 13 between an active/engaged position and an inactive/retracted position, wherein the other actuating ring 22 is assigned to the second locking element(s) 14, i.e. to move the second locking element(s) 14 between an active/engaged position and an inactive/retracted position.

The actuating elements/actuating rings 21, 22 of the displacement elements, may comprise ramp-shaped cross-sections for moving/pushing the locking elements 13, 14 into the corresponding recess of a respective ring 11, 12.

By the provided structure, the clutch unit 10 provides four different modes shown in FIGS. 7 to 10. In a first mode of operation shown in FIG. 7, no locking element 13, 14 engages a recess 15, 16 of the outer ring 12 so that both rings 11, 12 are independently rotatably provided.

In a second mode of operation shown in FIG. 8, only the first locking elements 13 engages a corresponding recess 15 of the outer ring 12 to provide a rotationally fixed connection of the two rings 11, 12 in at least the first direction of rotation, here a counter clockwise direction.

In a third mode of operation shown in FIG. 9, only the second locking elements 14 engages a corresponding recess 16 of the outer ring 12 to provide a rotationally fixed connection of the two rings 11, 12 in at least the second direction of rotation, here clockwise direction.

Figures 10A, 10B:
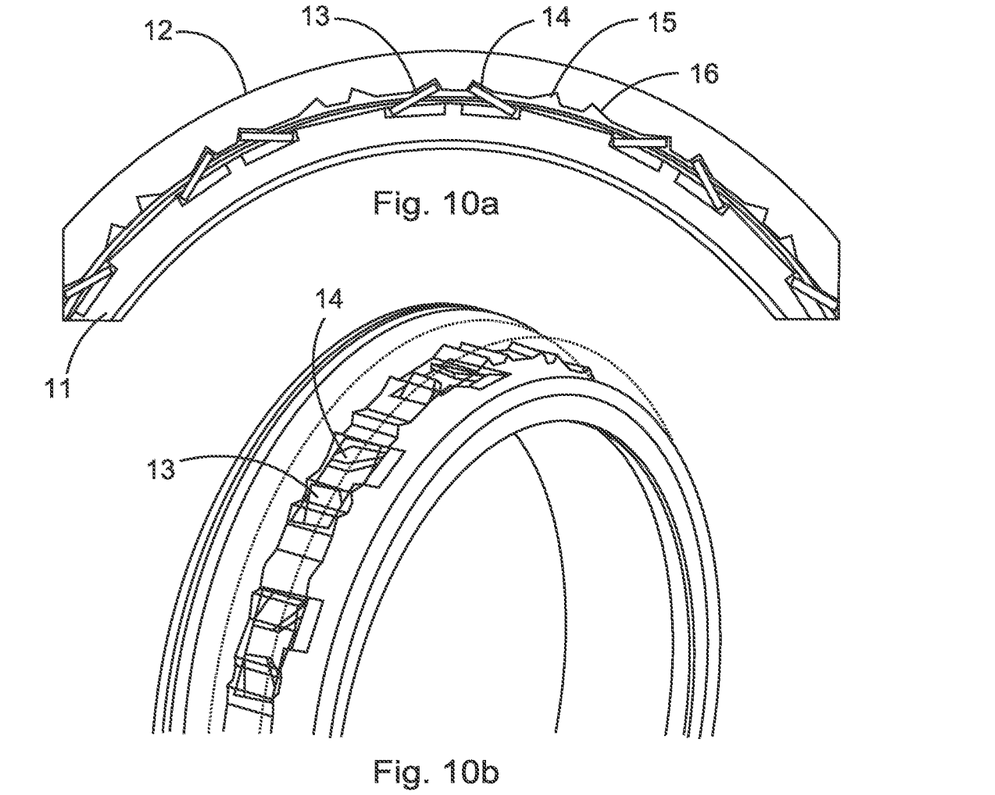
FIGS. 10a-10c are schematic views of the clutch unit in a fourth mode.
Figure 10C:
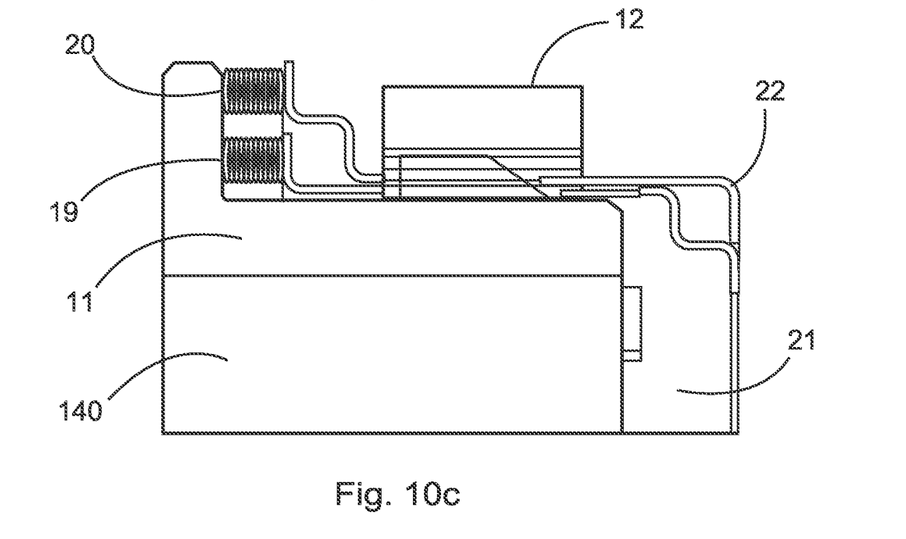

In a fourth mode of operation sown in FIG. 10, the first locking elements 13 and the second locking elements 14 engage corresponding recesses 15, 16 of the outer ring 12 to provide a rotationally fixed connection of the two rings 11, 12 in the first direction of rotation and the second direction of rotation.

In an example, e.g. in an all-wheel driving vehicle comprising two electric motors, the steps for regulating the clutch unit 10 from a fully disconnected state, i.e. the first mode of operation, where one of the electric motors is disconnected from the drive line/load, into a fully connected state, i.e. the fourth mode of operation, may as following: (i) it is detected that the needed power requires the $2^{nd}$ electric motor 110 to be connected to the drive line; (ii) the inverter is started up; (iii) the $2^{nd}$ electric motor 110 speed ramp up; (iv) the clutch unit 10 is set to the second operation mode;

(v) the $2^{nd}$ electric motor 110 reaches wheel speed and the first locking elements 13, e.g. counter clockwise pawl element(s) 13, engage the outer ring 12 such that the $2^{nd}$ electric motor 110 may apply a positive torque; (vi) the clutch unit 10 is set to the fourth mode such that the $2^{nd}$ electric motor 110 may apply negative torque, i.e. can be operated in a regeneration mode.

Other variations to the disclosed embodiment can be understood and effected by those skilled in the art in practicing the claimed subject-matter, from the study of the drawings, the disclosure, and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

LIST OF REFERENCE SIGNS 10 clutch unit
11 inner ring
12 outer ring
13 first locking elements/counter clockwise locking elements
14 second locking elements/clockwise locking elements
15 recesses for first locking elements
16 recesses for the second locking elements
17 first drive element/hydraulic cylinder arrangement
18 second drive element/hydraulic cylinder arrangement
19 first return element/spring element
20 second return element/spring element
21 first actuating element/actuating ring
22 second actuating element/actuating ring
100 drive unit
110 motor unit/electric motor unit
120 drive wheel/planetary carrier
130 gear wheel
140 differential housing unit
150 axis of rotation

The invention claimed is:

1. A clutch unit for a drive unit, comprising:
a plurality of rings comprising at least one outer ring and at least one inner ring, wherein the at least one outer ring and the at least one inner ring are mounted rotatably relative to each other, and wherein the at least one outer ring is configured to be in operative engagement with a first component of a drive unit of a vehicle and the at least one inner ring is configured to be in operative engagement with a second component of the drive unit of a vehicle;
at least one first locking element; and
at least one first displacement element, wherein the at least one first locking element is movably mounted on one of the at least one outer ring or the at least one inner ring and is movable by the at least one first displacement element to engage a corresponding recess of the other of the at least one outer ring or the at least one inner ring, wherein a rotationally fixed connection of the at least one outer ring or the at least one inner ring in at least a first direction of rotation is provided, and wherein the at least one first displacement element comprises:
at least one first actuating element that moves, in an axial direction, the at least one first locking element and that is provided by a first actuating ring, of the plurality of rings, arranged between the at least one outer ring and the at least one inner ring.

2. The clutch unit according to claim 1, further comprising:
at least one second locking element; and
at least one second displacement element, wherein the at least one second locking element is movably mounted on one of the at least one inner ring or at least one outer ring and movable by the at least one second displacement element in order to engage in a corresponding recess of the other of the at least one inner ring or the at least one outer ring, wherein a rotationally fixed connection of the at least one inner ring or the at least one outer ring in a second direction of rotation opposite to the first direction of rotation is provided, and wherein the at least one second displacement element comprises:
at least one second actuating element in operative engagement with the at least one second locking element in order to move the at least one second locking element, wherein the at least one second actuating element is provided by a second actuating ring, of the plurality of rings, arranged between the at least one outer ring and the at least one inner ring.

3. The clutch unit according to claim 2, wherein the clutch unit comprises a third mode of operation in which only the at least one second locking element engages a corresponding recess of the at least one outer ring or the at least one inner ring, providing a rotationally fixed connection of the at least one outer ring or the at least one inner ring in at least the second direction of rotation.

4. The clutch unit according to claim 2, wherein the clutch unit comprises a fourth mode of operation in which the at least one first locking element and the at least one second locking element each engage corresponding recesses of the at least one outer ring or the at least one inner ring, providing a rotationally fixed connection of the at least one outer ring or the at least one inner ring in the first direction of rotation and the second direction of rotation.

5. The clutch unit according to claim 2, wherein the at least one second displacement element further comprises:
at least one drive element and at least one return element.

6. The clutch unit according to claim 1, wherein the at least one first displacement element further comprises:
at least one drive element and at least one return element.

7. The clutch unit according to claim 6, wherein the at least one drive element comprises a hydraulic cylinder arrangement and the at least one return element comprises a spring element, and wherein the at least one drive element is configured to move the at least one first actuating element into one of two positions, and the at least one return element is configured to move the at least one first actuating element into the other of the two positions.

8. The clutch unit according to claim 1, wherein the at least one first displacement element comprises at least one ramp-shaped cross-section configured to move the at least one first locking element into the corresponding recess of the at least one inner ring or the at least one outer ring.

9. The clutch unit according to claim 8, wherein the at least one first actuating element comprises the at least one ramp-shaped cross-section configured to move the at least one first locking element into the corresponding recess of the at least one inner ring or the at least one outer ring.

10. The clutch unit according to claim 1, wherein the clutch unit comprises a first mode of operation in which none of a plurality of locking elements, comprising the at least one first locking element, engage any of a plurality of recesses, comprising the recess, such that both of the at least one outer ring and the at least one inner ring are independently rotatably provided.

11. The clutch unit according to claim 1, wherein the clutch unit comprises a second mode of operation in which only the at least one first locking element engages a corresponding recess of the at least one outer ring or the at least one inner ring, providing a rotationally fixed connection of the at least one outer ring or the at least one inner ring in at least the first direction of rotation.

12. A drive unit for a vehicle, comprising:
at least one motor unit;
at least one drive wheel operatively connected to and drivable by the at least one motor unit;
a differential gear with a housing unit driveable by the at least one drive wheel, wherein the at least one drive wheel and the housing unit are arranged around a common axis of rotation; and
at least one clutch unit provided between the at least one drive wheel and the housing unit, wherein the at least one clutch unit comprises:
a plurality of rings comprising at least one outer ring and at least one inner ring, wherein the at least one outer ring and the at least one inner ring are mounted rotatably relative to each other, and wherein the at least one outer ring is configured to be in operative engagement with a first component of a drive unit of a vehicle, and the at least one inner ring is configured to be in operative engagement with a second component of the drive unit of a vehicle;
at least one first locking element; and
at least one first displacement element, wherein the at least one first locking element is movably mounted on one of the at least one outer ring or the at least one inner ring and is movable by the at least one first displacement element to engage a corresponding recess of the other of the at least one outer ring or the at least one inner ring, wherein a rotationally fixed connection of the at least one outer ring or the at least one inner ring in at least a first direction of rotation is provided, and wherein the at least one first displacement element comprises:
at least one first actuating element that moves, in an axial direction, the at least one first locking element and that is provided by a first actuating ring, of the plurality of rings, arranged between the at least one outer ring and the at least one inner ring.

13. The drive unit for a vehicle according to claim 12, wherein:
the at least one inner ring of the at least one clutch unit is rotationally fixed to the housing unit of the differential gear; and
the at least one outer ring of the at least one clutch unit is rotationally fixed to the at least one drive wheel.

14. The drive unit for a vehicle according to claim 12, wherein at least one drive element of the at least one clutch unit is provided in the housing unit and the at least one drive element is connected to the at least one first actuating element.

15. The drive unit for a vehicle according to claim 12, wherein the at least one drive wheel at least partially encloses the housing unit.

16. The drive unit for a vehicle according to claim 12, wherein the drive unit comprises:

a first operating mode in which no torque is transmitted between the at least one drive wheel and the housing unit; or
a second operating mode in which torque is transmitted between the at least one drive wheel and the housing unit in a first direction of torque only; or
a third mode of operation in which torque is transmitted in a second direction of torque between the at least one drive wheel and the housing unit in the second direction of torque only, wherein the first direction of torque is distinct from the second direction of torque; or
a fourth mode of operation in which torque is transmitted in the first direction of torque and the second direction of torque between the at least one drive wheel and the housing unit.

17. The drive unit for a vehicle according to claim 12, wherein the at least one motor unit and the at least one drive wheel are operatively connected by a gear wheel unit.

18. A vehicle comprising an electric drive, comprising at least one drive unit, wherein the drive unit comprises:
at least one motor unit;
at least one drive wheel operatively connected to and drivable by the at least one motor unit;
a differential gear with a housing unit driveable by the at least one drive wheel, wherein the at least one drive wheel and the housing unit are arranged around a common axis of rotation; and
at least one clutch unit provided between the at least one drive wheel and the housing unit, wherein the at least one clutch unit comprises:
a plurality of rings comprising at least one outer ring and at least one inner ring, wherein the at least one outer ring and the at least one inner ring are mounted rotatably relative to each other, and wherein the at least one outer ring is configured to be in operative engagement with a first component of the drive unit of the vehicle, and the at least one inner ring is configured to be in operative engagement with a second component of the drive unit of the vehicle;
at least one first locking element; and
at least one first displacement element, wherein the at least one first locking element is movably mounted on one of the at least one outer ring or the at least one inner ring and is movable by the at least one first displacement element to engage a corresponding recess of the other of the at least one outer ring or the at least one inner ring, wherein a rotationally fixed connection of the at least one outer ring or the at least one inner ring in at least a first direction of rotation is provided, and wherein the at least one first displacement element comprises:
at least one first actuating element that moves, in an axial direction, the at least one first locking element and that is provided by a first actuating ring, of the plurality of rings, arranged between the at least one outer ring and the at least one inner ring.

19. The vehicle of claim 18, wherein
the at least one inner ring of the at least one clutch unit is rotationally fixed to the housing unit of the differential gear; and
the at least one outer ring of the at least one clutch unit is rotationally fixed to the at least one drive wheel.

20. The vehicle of claim 18, wherein at least one drive element of the at least one clutch unit is provided in the housing unit and the at least one drive element is connected to the at least one first actuating element.

* * * * *